(12) United States Patent
Yim

(10) Patent No.: US 11,451,936 B2
(45) Date of Patent: Sep. 20, 2022

(54) METHOD FOR FORMING GROUP OF BLUETOOTH DEVICES

(71) Applicant: ROBO RISEN CO., LTD., Seoul (KR)

(72) Inventor: Sang Bin Yim, Seoul (KR)

(73) Assignee: ROBO RISEN CO., LTD., Seoul (KR)

( * ) Notice: Subject to any disclaimer, the term of this patent is extended or adjusted under 35 U.S.C. 154(b) by 0 days.

(21) Appl. No.: 17/276,044

(22) PCT Filed: Jul. 17, 2020

(86) PCT No.: PCT/KR2020/009462
§ 371 (c)(1),
(2) Date: Mar. 12, 2021

(87) PCT Pub. No.: WO2021/010794
PCT Pub. Date: Jan. 21, 2021

(65) Prior Publication Data
US 2022/0053297 A1 Feb. 17, 2022

(30) Foreign Application Priority Data
Jul. 17, 2019 (KR) .................. 10-2019-0086160

(51) Int. Cl.
| | | |
|---|---|---|
| *H04W 4/08* | (2009.01) | |
| *H04W 4/80* | (2018.01) | |
| *B25J 9/16* | (2006.01) | |
| *H04W 84/20* | (2009.01) | |

(52) U.S. Cl.
CPC .............. *H04W 4/08* (2013.01); *B25J 9/1617* (2013.01); *H04W 4/80* (2018.02); *H04W 84/20* (2013.01)

(58) Field of Classification Search
CPC ......... H04W 4/08; H04W 4/80; H04W 76/15; H04W 92/18; H04W 76/10; H04W 76/00; B25J 9/16; B25J 9/1617
See application file for complete search history.

(56) References Cited

FOREIGN PATENT DOCUMENTS

KR 10-2016-0021313 * 2/2016 ............ H04L 12/12

OTHER PUBLICATIONS

International Search Report dated Oct. 13, 2020, in International Application No. PCT/KR2020/009462 (with English Translation).

* cited by examiner

*Primary Examiner* — Tuan H Nguyen
(74) *Attorney, Agent, or Firm* — H.C. Park & Associates, PLC

(57) ABSTRACT

A method for forming a group from a plurality of Bluetooth devices includes forming one subgroup with some of the plurality of Bluetooth devices; and, with respect to Bluetooth mediating devices that are at least some of the plurality of Bluetooth devices belonging to the subgroup, forming, by the Bluetooth mediating device, one lower subgroup having the subgroup as an upper subgroup thereof, together with the plurality of Bluetooth devices which do not yet belong to any subgroup.

5 Claims, 13 Drawing Sheets

FIG. 11

| Cube No. | 1 | 2 | 3 | 4 |
|---|---|---|---|---|
| Control sequence | 30 | 60 | -30 | 60 |
| | 30 | -30 | -30 | 90 |
| | 30 | 90 | -30 | 120 |
| | 30 | 60 | -30 | 60 |
| | 30 | -30 | -30 | 90 |
| | 30 | 90 | -30 | 120 |
| | ⋮ | ⋮ | ⋮ | ⋮ |

1000

1000-1  1000-2  1000-3  1000-4

METHOD FOR FORMING GROUP OF BLUETOOTH DEVICES

CROSS-REFERENCE TO RELATED APPLICATION

This application is a National Stage Entry of International Application No. PCT/KR2020/009462, filed on Jul. 17, 2020, and claims priority from and the benefit of Korean Patent Application No. 10-2019-0086160, filed on Jul. 17, 2019, each of which is hereby incorporated by reference for all purposes as if fully set forth herein.

BACKGROUND

Field

The present invention relates to a method for forming a group of a plurality of Bluetooth devices to control the plurality of Bluetooth devices included in the group all at the same time.

Discussion of the Background

Bluetooth, which is developed by Ericsson, is an industry standard for short-range wireless communication for personal use to allow wireless communication between digital communication devices. Bluetooth, which describes short-range data communication between the electronic devices with Ultra-high frequency (UHF) of 2.4 to 2.485 GHz included in an Industrial Scientific and Medical (ISM) band, is used to transmit and receive digital information including text information and voice information to and from mouses and keyboards used for personal computers, cellular phones, smartphones, tablets, and speakers at a relatively low speed through wireless communication. Bluetooth is used to exchange simple information between information devices having a distance from several miters to tens of meters through radio waves.

Bluetooth is used in various applications such as telecommunication, computers, networks, and household appliances, and there is a need to efficiently control a substantially large number of Bluetooth devices all at the same time according to its application field. In this case, a representative example is a modular robot system that is capable of coupling simple-shaped modules in which Bluetooth communication functions are built to one another to provide various shapes and functions and complex motions.

Recently, many kinds of robot toys, which are popular to children and teenagers, have appeared on the market. The robot toys are toys that are configured to automatically take given motions with electric power supplied thereto. They are generally provided as finished products, and most of them take monotonous and simple motions, so that children and teenagers are likely to lose interest in playing with them. Accordingly, robot toys, which can be coupled to one another to provide various outer shapes and motions, have released in the market, but so as to allow the robot toys to take various outer shapes and motions, in this case, blocks with only specific functions have to be needed, so that if a user wants to couple robot toys with one another, all blocks needed for the robot toys should be prepared. Besides, other blocks have to be additionally purchased if he or she wants to couple robot toys with different functions or motions with one another. Accordingly, disadvantageously, a purchase cost becomes substantially raised. In this case, a modular robot can become a practical alternative to the conventional robot toys.

SUMMARY

Accordingly, the present invention has been made to solve the above-mentioned problems, and it is an object of the present invention to provide a method for forming a group of a plurality of Bluetooth devices to control the plurality of Bluetooth devices included in the group all at the same time.

To accomplish the above-mentioned objects, according to one aspect of the present invention, there is provided a method for forming a group of a plurality of Bluetooth devices, including the steps of: forming one subgroup with some of the plurality of Bluetooth devices; and with respect to Bluetooth mediating devices that are at least some of the plurality of Bluetooth devices belonging to the subgroup, forming, by each Bluetooth mediating device, one lower subgroup having the subgroup as an upper subgroup thereof, together with the plurality of Bluetooth devices which do not yet belong to any subgroup, wherein the step of forming one subgroup with some of the plurality of Bluetooth devices includes the steps of: setting any one of the plurality of Bluetooth devices belonging to the subgroup as the Bluetooth central device of the subgroup; and connecting the rest of the Bluetooth devices, as the Bluetooth peripheral devices of the subgroup, except the Bluetooth central device of the plurality of Bluetooth devices belonging to the subgroup, to the Bluetooth central device of the subgroup, and the step of forming, by each Bluetooth mediating device, one lower subgroup having the subgroup as the upper subgroup thereof, together with the plurality of Bluetooth devices which do not yet belong to any subgroup, includes the steps of: setting the Bluetooth mediating devices as multi-role Bluetooth devices, the multi-role Bluetooth devices operating as the Bluetooth peripheral devices with respect to the Bluetooth central device belonging to upper subgroups thereof and as the Bluetooth central devices with respect to the Bluetooth devices belonging to lower subgroups thereof; and connecting the rest of the Bluetooth devices, as the Bluetooth peripheral devices of the lower subgroups, except the Bluetooth mediating devices of the plurality of Bluetooth devices belonging to the lower subgroups, to the Bluetooth mediating devices as the Bluetooth central devices of the lower subgroups.

According to the present invention, the step of setting any one of the plurality of Bluetooth devices belonging to the subgroup as the Bluetooth central device of the subgroup includes the steps of: connecting an uppermost Bluetooth device as any one of the plurality of Bluetooth devices belonging to the subgroup, as the Bluetooth peripheral device, to a given control device; and setting the uppermost Bluetooth device as the multi-role Bluetooth device.

According to the present invention, the method further includes the step of, with respect to end Bluetooth mediating devices that are at least some of the plurality of Bluetooth devices belonging to at least one end subgroup having no lower subgroup, forming, by each end Bluetooth mediating device, one lower subgroup having the subgroup to which the end Bluetooth mediating device belongs as an upper subgroup thereof, together with the plurality of Bluetooth devices which do not yet belong to any subgroup.

According to the present invention, the method further includes the steps of: if the uppermost Bluetooth central device as the Bluetooth central device of the uppermost subgroup receives a given control command, after the group of the plurality of Bluetooth devices has been formed, transmitting the given control command to the Bluetooth peripheral devices belonging to the uppermost subgroup; and if each Bluetooth mediating device of the group of the plurality of Bluetooth devices receives the given control command from the Bluetooth central device of the subgroup thereof, transmitting the given control command to the Bluetooth peripheral devices connected thereto.

According to the present invention, each Bluetooth device is a cube-type unit robot, the cube-type unit robot including: a housing in the shape of a regular hexahedron; a step motor located in the housing; and a controller located in the housing to control the step motor, wherein the housing has a mounting groove formed on one surface thereof to mount a rotary body rotating by a rotary shaft of the step motor thereon and connection grooves with the same shape as each other formed on the other surfaces thereof, so that through connectors mounted on the connection grooves, the cube-shaped unit robot is connectable to another cube-type unit robot.

To accomplish the above-mentioned objects, according to another aspect of the present invention, there is provided a non-transitory computer-readable recording medium recording a computer program for performing the method according to the present invention.

According to the present invention, the method can form the group of the plurality of Bluetooth devices to control the plurality of Bluetooth devices included in the group all at the same time.

According to the present invention, the modularized unit blocks having a simple shape are coupled to one another to provide various shapes and functions, thereby providing the modular robot system which can perform complicated motions. In this case, the modular robot system can have different cube-type unit robot coupling ways or accessories, thereby providing the cube-type unit robots having various shapes. According to the present invention, in particular, the cubes having the simple shape are coupled to one another through various ways, thereby providing the finished modular robot having various shapes.

BRIEF DESCRIPTION OF THE DRAWINGS

The following drawings herein illustrate various embodiments of the present invention and serve to facilitate the general understanding of the scope of the present invention.

FIG. 11 is a view showing an example of a lookup table including descriptors of step motor control sequences.

DETAILED DESCRIPTION

Figure 1:
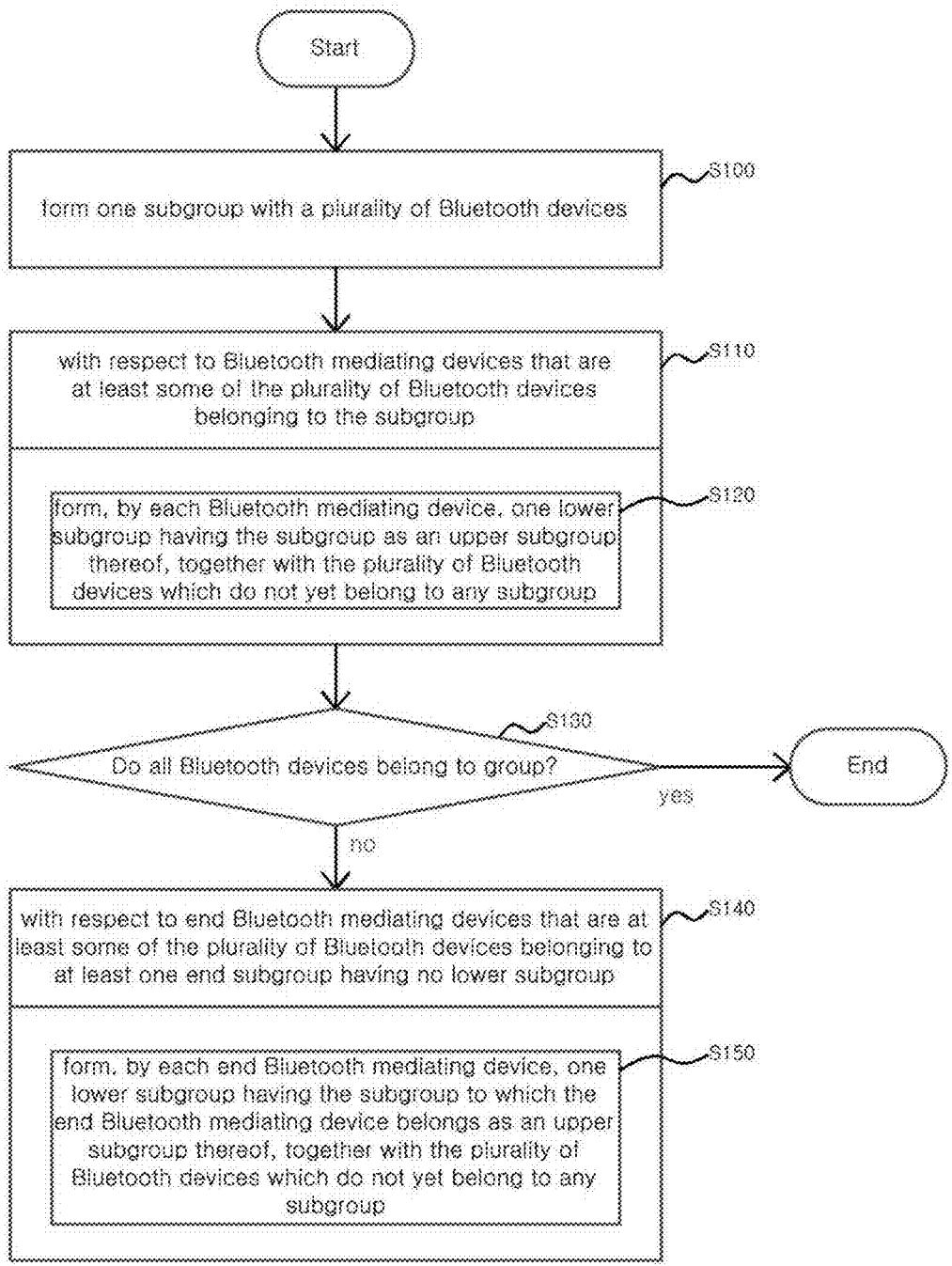
FIG. 1 is a flowchart showing a method for forming a group of Bluetooth devices according to the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention. If it is determined that the detailed explanation on the well known technology related to the present invention makes the scope of the present invention not clear, the explanation will be avoided for the brevity of the description.

Terms, such as the first, and the second, may be used to describe various elements, but the elements should not be restricted by the terms. The terms are used to only distinguish one element from the other element.

Terms used in this application are used to only describe specific exemplary embodiments and are not intended to restrict the present invention. An expression referencing a singular value additionally refers to a corresponding expression of the plural number, unless explicitly limited otherwise by the context.

In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

When it is said that one element is described as "transmitting" data to the other element, one element may directly transmit data to the other element or may transmit data to the other element through at least one another element. Contrarily, when it is said that if one element "directly transmits" data to the other element, it should be understood that the data is transmitted to the other element from one element, not through another element.

Hereinafter, the present invention will now be described in detail with reference to the attached drawings wherein the corresponding parts in the embodiments of the present invention are indicated by corresponding reference numerals.

FIG. 1 is a flowchart showing a method for forming a group of Bluetooth devices according to the present invention.

A method for forming a group of Bluetooth devices according to the present invention is carried out by allowing each Bluetooth device to belong to one group, so that the Bluetooth devices included in the group can be controlled all at the same time. The group of Bluetooth devices can be constituted of a plurality of subgroups.

Referring to FIG. 1, one subgroup is formed with a plurality of Bluetooth devices (Step S100).

Each Bluetooth device is a device which can perform short-range wireless communication with another Bluetooth device under Bluetooth standards. The Bluetooth devices are mobile devices such as computers, cellular phones, smartphones, and tablets, but they may become input devices like keyboards and mouses and output devices like speakers, without being limited thereto. According to the present invention, further, the Bluetooth devices may become cube-type unit robots as will be discussed later.

Figure 2:
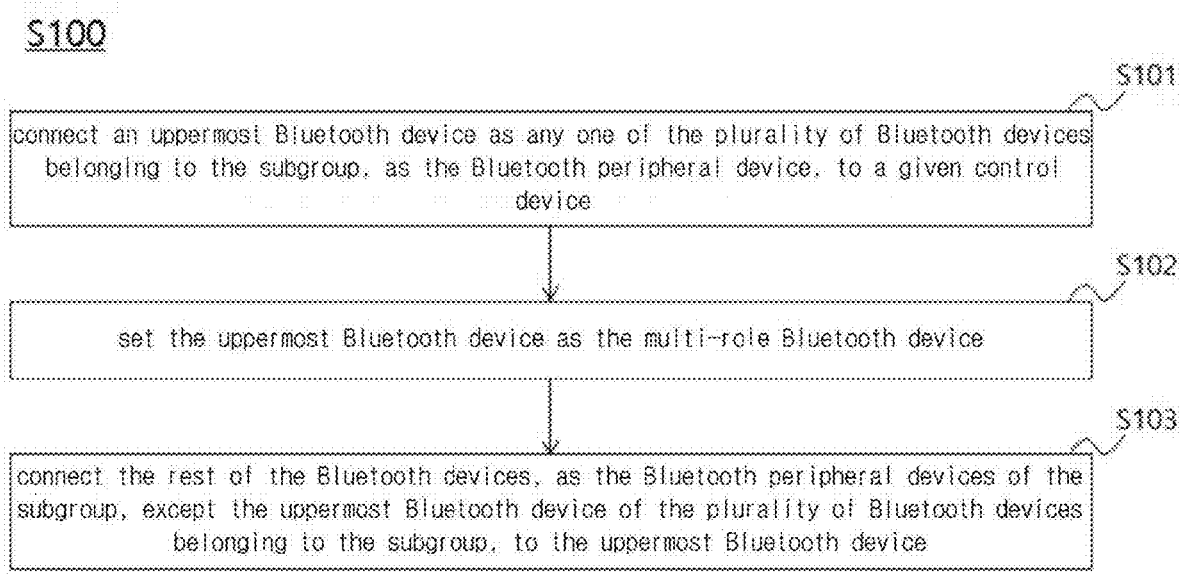
FIG. 2 is a flowchart showing specific steps of step S100 of FIG. 1.

FIG. 2 is a flowchart showing specific steps in the step S100 (of forming one subgroup with the plurality of Bluetooth devices) of FIG. 1.

Referring to FIG. 2, any one of the plurality of Bluetooth devices belonging to the subgroup can be set as a Bluetooth central device of the subgroup. To do this, an uppermost Bluetooth device as any one of the plurality of Bluetooth devices belonging to the subgroup is connected, as a Bluetooth peripheral device, to a given control device (Step S101), and the uppermost Bluetooth device can be set as a multi-role Bluetooth device (Step S102).

In this case, the multi-role Bluetooth device means a device which functions as both of the Bluetooth central device and the Bluetooth peripheral device. Accordingly, the uppermost device set as the multi-role Bluetooth device operates as the Bluetooth peripheral device with respect to the Bluetooth central device connected thereto, but it operates as the Bluetooth central device with respect to other Bluetooth devices of the subgroup connected thereto.

On the other hand, the rest of the Bluetooth devices, except the uppermost Bluetooth device as the Bluetooth central device of the plurality of Bluetooth devices belonging to the subgroup, are connected, as the Bluetooth peripheral devices of the subgroup, to the uppermost Bluetooth device (Step S103).

Referring back to FIG. 1, after the subgroup has been formed, step S120 for Bluetooth mediating devices that are at least some of the plurality of Bluetooth devices belonging to the subgroup can be carried out (Step S110).

At the step S120, each Bluetooth mediating device forms one lower subgroup with the subgroup as an upper subgroup thereof, together with the plurality of Bluetooth devices which do not yet belong to any subgroup (Step S120).

Figure 3:
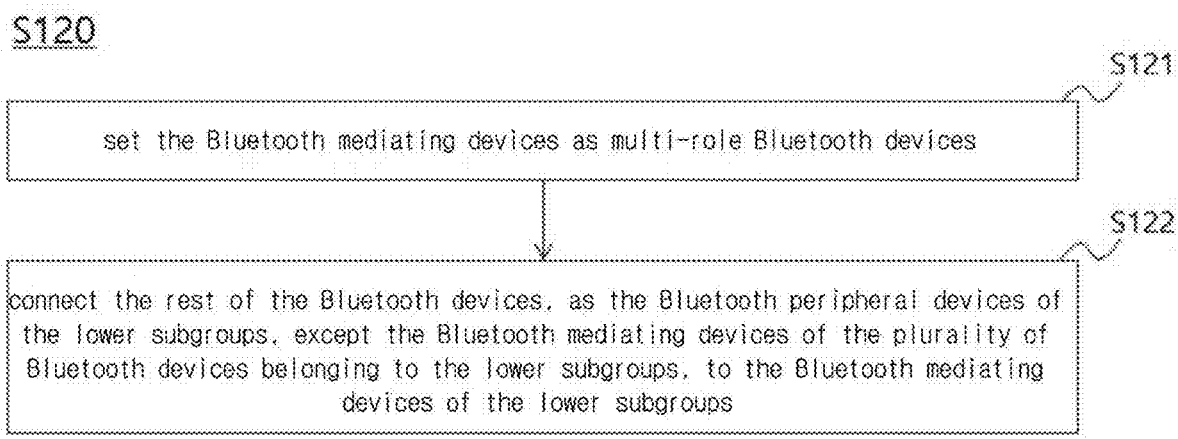
FIG. 3 is a flowchart showing specific steps of step S120 of FIG. 1.

FIG. 3 is a flowchart showing specific steps in the step S120 (of forming, by each Bluetooth mediating device, one lower subgroup with the subgroup as an upper subgroup thereof, together with the plurality of Bluetooth devices which do not yet belong to any subgroup) of FIG. 1.

Referring to FIG. 3, the Bluetooth mediating devices can be set as multi-role Bluetooth devices (Step S121).

In specific, the Bluetooth mediating devices set as the multi-role Bluetooth devices operate as the Bluetooth peripheral devices with respect to the Bluetooth central device belonging to upper subgroups thereof, but they operate as the Bluetooth central devices with respect to the Bluetooth devices belonging to lower subgroups thereof.

Accordingly, the rest of the Bluetooth devices, except the Bluetooth mediating devices of the plurality of Bluetooth devices belonging to the lower subgroups, are connected, as the Bluetooth peripheral devices of the lower subgroups, to the Bluetooth mediating devices as the Bluetooth central devices of the lower subgroups (Step S122).

Referring back to FIG. 1, if all of the Bluetooth devices belong to the group, the process of forming the group is completed (See step S130), but if the Bluetooth devices which do not belong to the group exist, step S150 for end Bluetooth mediating devices which are at least some of the Bluetooth devices belonging to at least any one end subgroup having no lower subgroup is carried out (Step S140).

At the step S150, each end Bluetooth mediating device can form one lower subgroup with the subgroup to which the end Bluetooth mediating device belongs as an upper subgroup thereof, together with the plurality of Bluetooth devices which do not yet belong to any subgroup (Step S150).

According to the present invention, as shown in FIG. 3, each end Bluetooth mediating device can be set as a multi-role Bluetooth device, and the rest of the Bluetooth devices, except the Bluetooth mediating devices of the plurality of Bluetooth devices belonging to the subgroup, are connected, as the Bluetooth peripheral devices of the lower subgroup, to the end Bluetooth mediating device as the Bluetooth central device of the lower subgroup.

The steps S140 and S150 are repeatedly carried out until all of the Bluetooth devices belong to one group. Whenever the steps S140 and S150 are performed, the number of subgroups is increased, so that all of the Bluetooth devices constitute one group.

Figure 4:
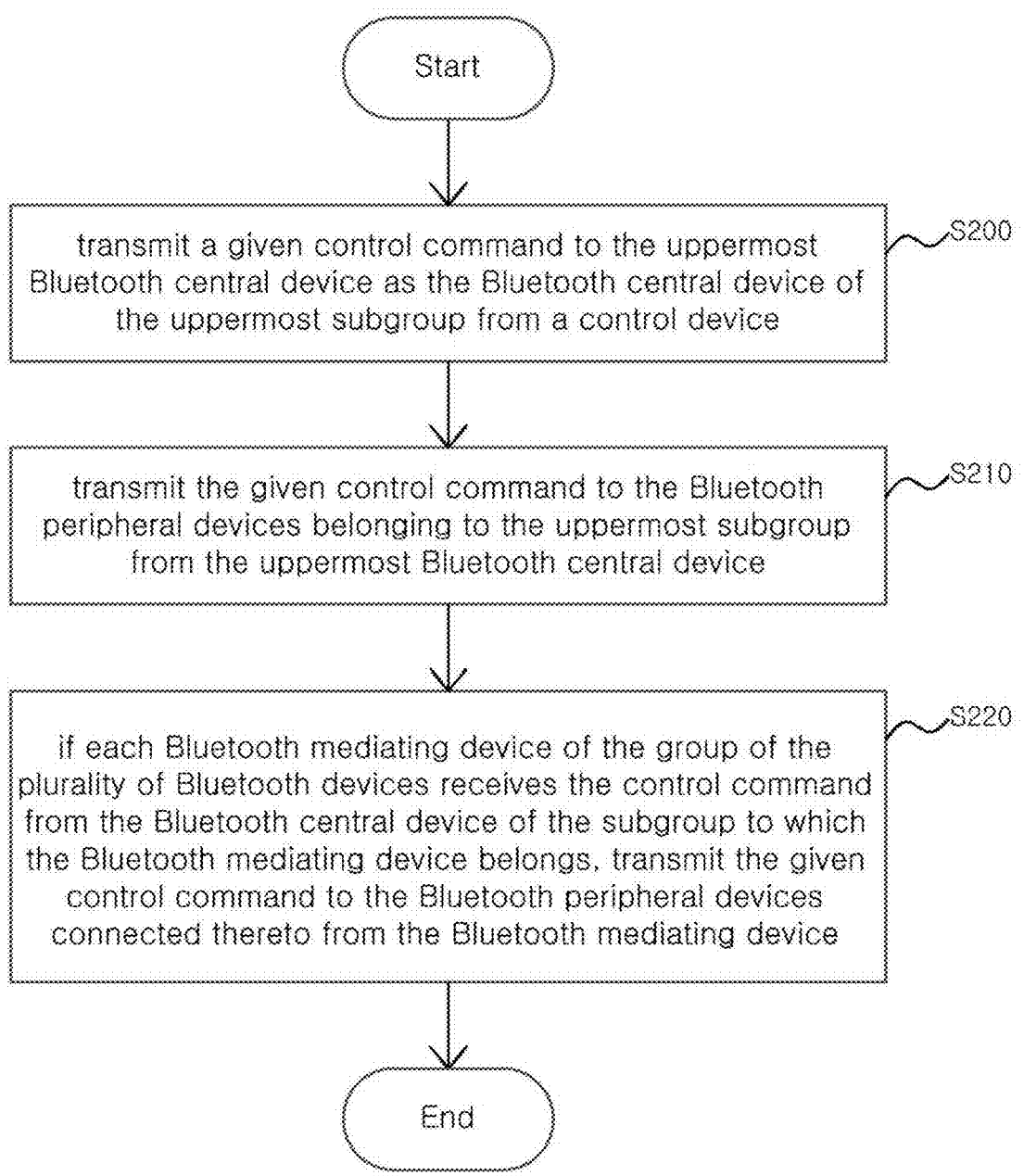
FIG. 4 is a schematic view showing a process in which the Bluetooth devices are grouped.

Hereinafter, a process of forming one group with 15 Bluetooth devices will be explained with reference to FIG. 4. If the formation of the group is completed, one group G as shown in FIG. 4 is formed, and all of the Bluetooth devices 1 to 15 in the group G are controlled all at the same time by means of a main control device (for example, a smartphone 0).

First, any one Bluetooth device (for example, 1 in FIG. 4) is selected by the smartphone 0, and the selected Bluetooth device 1 is connected, as a Bluetooth peripheral device of the smartphone 0, to the smartphone 0. On the other hand, the selected Bluetooth device 1 can be set as a multi-role Bluetooth device by means of a command of the smartphone 0.

As mentioned above, the multi-role Bluetooth device means the Bluetooth device that operates as the Bluetooth peripheral device with respect to any one Bluetooth device and operates as the Bluetooth central device with respect to at least another Bluetooth device. For example, the Bluetooth device 1 operates as the Bluetooth peripheral device with respect to the smartphone 0, but it operates as the Bluetooth central device with respect to other Bluetooth devices 2 to 5 constituting a subgroup G1 later.

The Bluetooth device 1 as the multi-role Bluetooth device is connected to the neighboring Bluetooth devices 2 to 5 so that the Bluetooth devices 1 to 5 constitute one subgroup G1. In this case, the subgroup G1 includes the Bluetooth device directly connected to the smartphone 0 as the control device, and accordingly, the subgroup G1 can be the uppermost subgroup.

After that, some Bluetooth devices 2 and 5 as shown in FIG. 4, except the Bluetooth device as the Bluetooth central device of the plurality of Bluetooth devices belonging to the subgroup G1, can be set as multi-role Bluetooth devices, and they can serve as Bluetooth central devices with respect to other subgroups, except the subgroup G1.

As shown in FIG. 4, the Bluetooth device 2 is the Bluetooth central device of the subgroup G2 constituted of the Bluetooth device 2 and the Bluetooth devices 6 to 8, and the Bluetooth devices 6 to 8 can be connected, as the Bluetooth peripheral devices, to the Bluetooth device 2.

Further, the Bluetooth device 5 is the Bluetooth central device of the subgroup G3 constituted of the Bluetooth device 5 and the Bluetooth devices 9 to 12, and the Bluetooth devices 9 to 12 can be connected, as the Bluetooth peripheral devices, to the Bluetooth device 5.

In this case, the subgroup G1 is the upper subgroup with respect to the subgroups G2 and G3, and the subgroups G2 and G3 are the lower subgroups with respect to the subgroup G1.

In the same manner as above, any one Bluetooth device 6 as shown in FIG. 4 of the plurality of Bluetooth devices belonging to the subgroup G2 can be set as a multi-role Bluetooth device, and the Bluetooth device 6 can serve as a Bluetooth central device with respect to another subgroup G4. That is, as shown in FIG. 4, the Bluetooth devices 13 to 15 are connected, as the Bluetooth peripheral devices, to the Bluetooth device 6, to constitute the subgroup G4, together with the Bluetooth device 6 as the Bluetooth central device. In this case, the subgroup G2 is the upper subgroup with respect to the subgroup G4, and the subgroup G4 is the lower subgroup with respect to the subgroup G2.

In this manner, the Bluetooth devices 1 to 15 are clustered to one group constituted of the plurality of subgroups, so that they can be controlled all at the same time by means of the smartphone 0.

Figure 5:
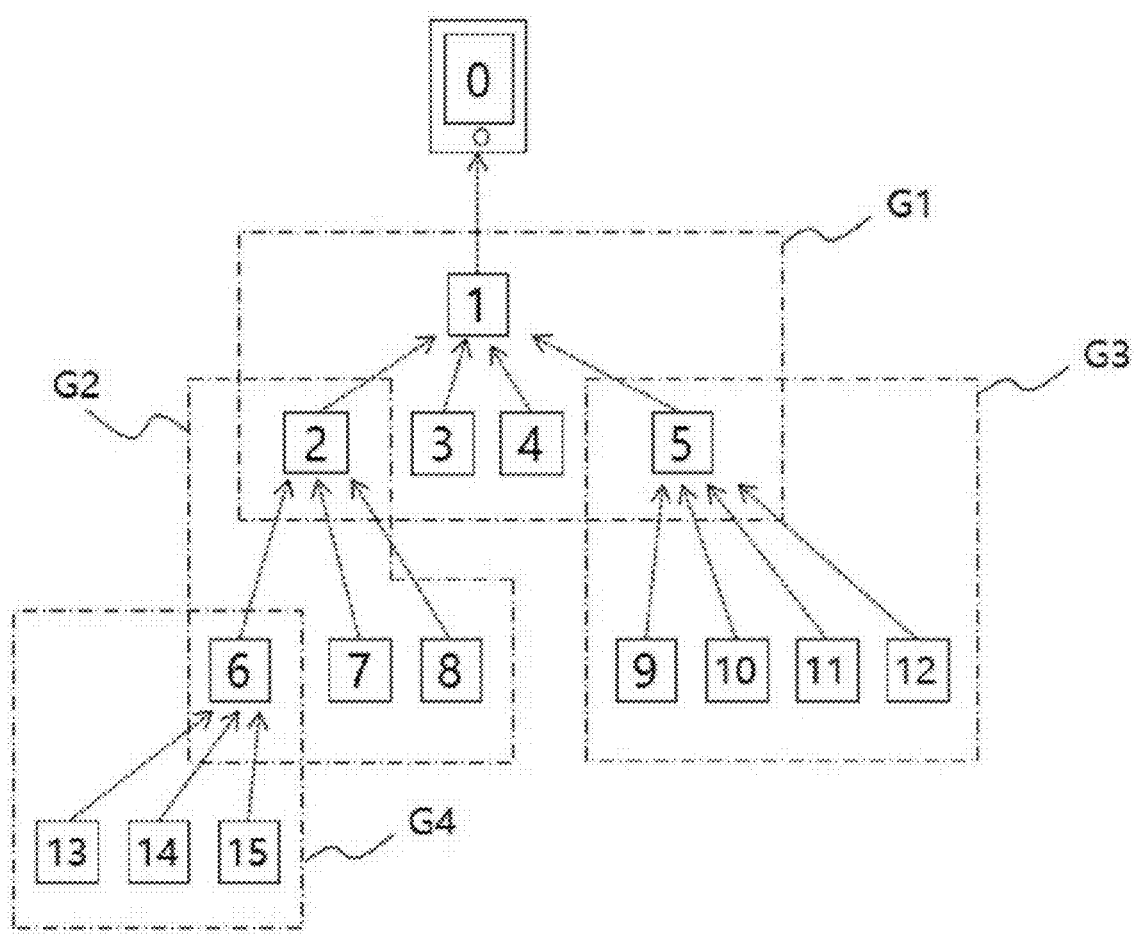
FIG. 5 is a flowchart showing steps in which the Bluetooth devices included in the groups are controlled by means of a control device after the groups have been formed.

FIG. 5 is a flowchart showing steps in which the Bluetooth devices included in the group are controlled by means of the control device (for example, the smartphone) after the group has been formed.

Referring to FIG. 5, the control device (for example, smartphone) transmits a given control command to the uppermost Bluetooth central device as the Bluetooth central device of the uppermost subgroup (Step S200).

If the uppermost Bluetooth central device as the Bluetooth central device of the uppermost subgroup in the group to which the plurality of Bluetooth devices belong receives the given control command, the uppermost Bluetooth central device transmits the control command to the Bluetooth peripheral devices belonging to the uppermost subgroup (Step S210).

If each Bluetooth mediating device of the group of the plurality of Bluetooth devices receives the control command from the Bluetooth central device of the subgroup to which the Bluetooth mediating device belongs, the Bluetooth mediating device transmits the control command to the Bluetooth peripheral devices connected thereto (Step S220).

For example, as shown in FIG. 4, if the group G is formed with the Bluetooth devices 1 to 15, the smartphone 0 as the control device transmits the given control command to the Bluetooth central device 1 of the uppermost subgroup G1 (at the step S200).

Next, the uppermost Bluetooth central device as the Bluetooth central device 1 of the uppermost subgroup G1 transmits the control command to the Bluetooth peripheral devices 2 to 5 belonging to the uppermost subgroup G1 (at the step S210).

After that, the Bluetooth devices 2 and 5 as the Bluetooth mediating devices, which receive the control command, transmit the control command to the Bluetooth peripheral devices connected thereto (at the step S220). Accordingly, the Bluetooth device 2 transmits the control command to the Bluetooth devices 6 to 8, and the Bluetooth device 5 transmits the control command to the Bluetooth devices 9 to 12.

The Bluetooth device 6 as the Bluetooth mediating device, which receives the control command from the Bluetooth device 2, transmits the control command to the Bluetooth peripheral devices 13 to 15 connected thereto.

Like this, transmission of the control command from the control device (the smartphone 0) to the uppermost device 1 enables all of the Bluetooth devices in the group G to be controlled all at the same time.

The method for forming the group with the Bluetooth devices and the method for controlling the group are very useful particularly if some of the Bluetooth devices are separated by a long distance from the control device or if the number of Bluetooth peripheral devices connected simultaneously to the Bluetooth central device is limited.

According to the present invention, further, the Bluetooth devices constituting the group may be cube-type unit robots, and accordingly, they may constitute a modular robot system. Hereinafter, an explanation of the modular robot system according to the present invention will be in detail given.

Figure 6:
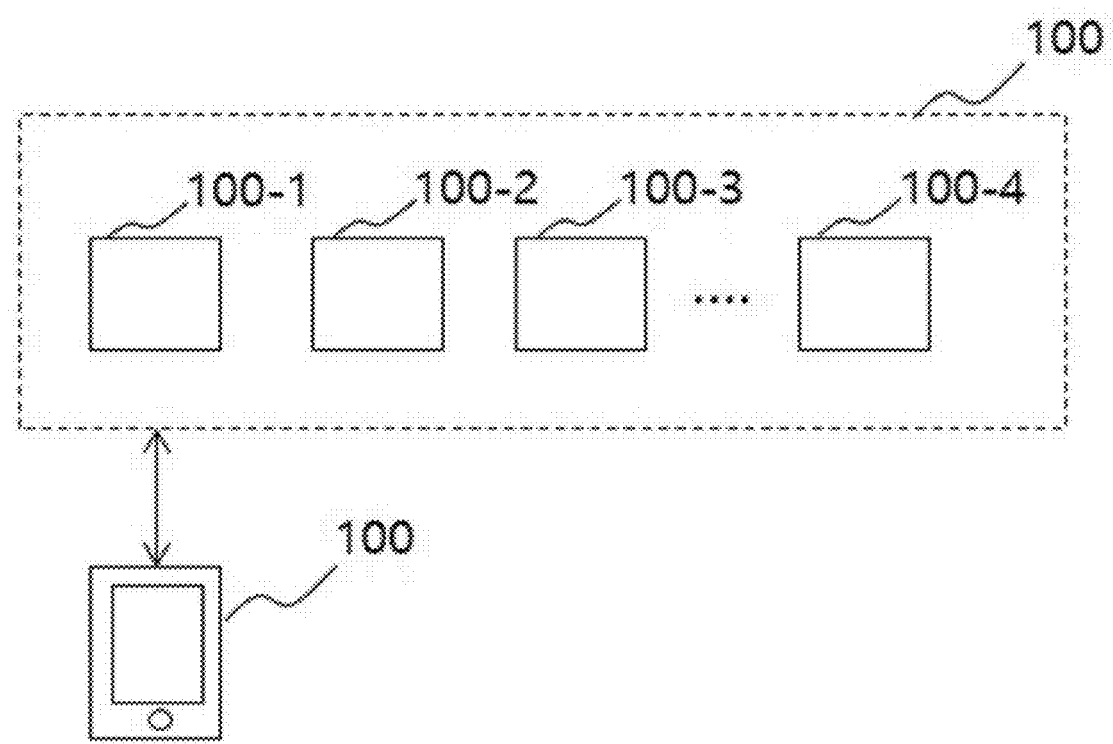
FIG. 6 is a schematic view showing a configuration of a modular robot system according to the present invention.

FIG. 6 is a schematic view showing a configuration of a modular robot system according to the present invention.

A modular robot system according to the present invention includes N (N is an integer greater than or equal to 2) cube-type unit robots 100-1 to 100-N. The N cube-type unit robots 100-1 to 100-N are coupled to one another to constitute one modular robot. According to the above-mentioned method, further, the N cube-type unit robots 100-1 to 100-N are coupled to one another to constitute one group 100 through Bluetooth communication.

The modular robot system further includes a central control terminal 200 for controlling the N cube-type unit robots 100-1 to 100-N.

Only if the central control terminal 200 is a data processing device that performs calculation and data processing or receives input materials to thus perform, store and output the received data, it doesn't matter what kind of data processing device is used. For example, the central control terminal 200 may be a data processing device such as a general computer, a personal computer, a server, a mobile terminal, a remote station, a remote terminal, an access terminal, a terminal, a communication device, a communication terminal, a user agent, a user device or user equipment (UE), a laptop computer, a tablet PC, a smart phone, and a PDA (personal digital assistant).

The central control terminal 200 can perform Bluetooth communication with the uppermost Bluetooth device (for example, the cube 100-1) in the group 100 and transmits a control command to the cube 100-1. Further, the N cube-type unit robots 100-1 to 100-N can perform the wireless communication with one another through the Bluetooth communication.

On the other hand, the N cube-type unit robots 100-1 to 100-N have the shape of a cube with the same size as each other. The respective N cube-type unit robots 100-1 to 100-N are coupled to one another by means of given connectors, and all of the N cube-type unit robots 100-1 to 100-N are coupled to one another to thus constitute one modular robot system.

Now, an explanation of each cube-type unit robot constituting the modular robot system according to the present invention will be in detail given with reference to FIGS. 7 to 9F.

Figure 7:
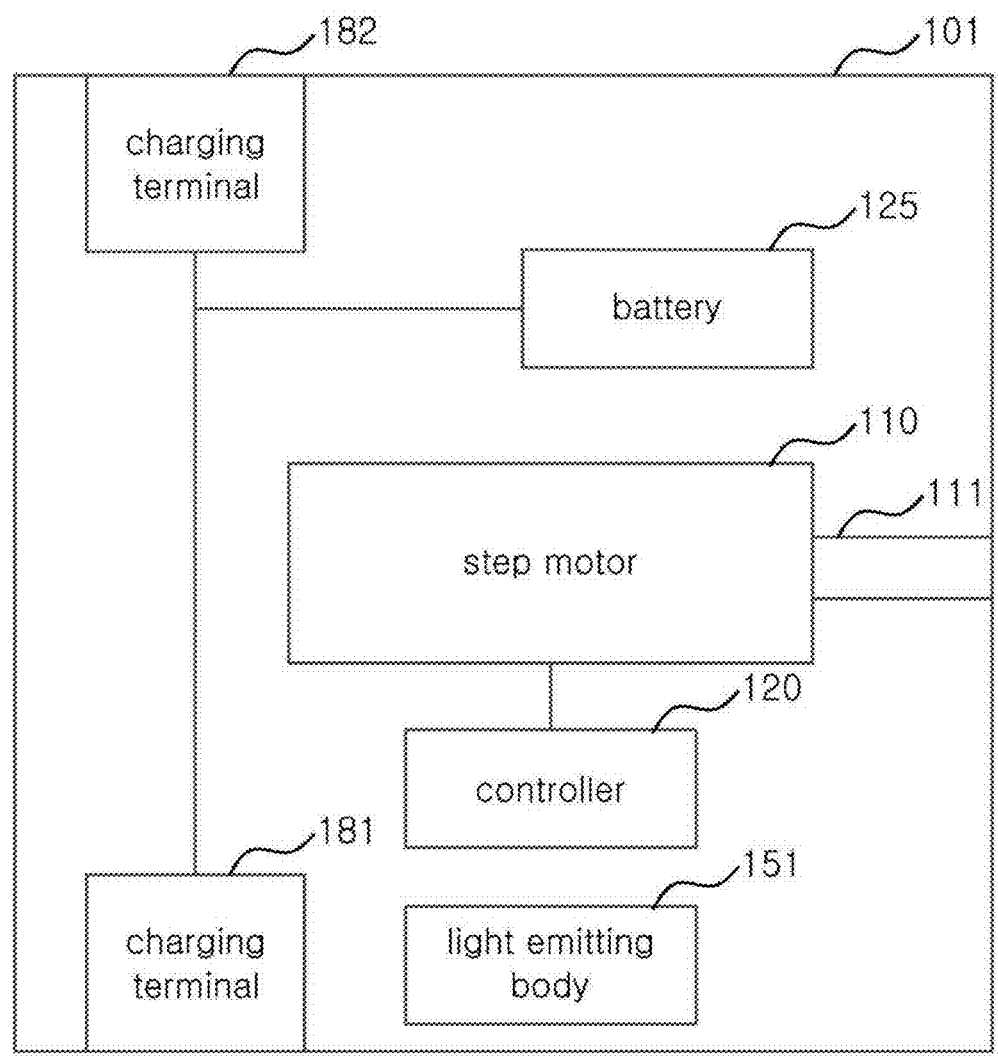
FIG. 7 is a block diagram showing a configuration of a cube-type unit robot constituting the modular robot system according to the present invention.

FIG. 7 is a block diagram showing a configuration of the cube-type unit robot constituting the modular robot system according to the present invention.

As shown in FIG. 7, each cube-type unit robot 100 (hereinafter referred to as 'cube') includes a housing 101 and a step motor 110 and a controller 120 that are located inside the housing 101. According to the present invention, the cube 100 further includes a battery 125, a light emitting body 151, and/or one or more charging terminals 181 and/or 182. According to the present invention, the cube 100 further may include other components in addition to the components as shown in FIG. 7.

The step motor 110, also known as stepper motor or stepping motor, is a brushless DC electric motor that divides a full rotation into a number of equal steps. The step motor 110 rotates a rotary body fitted to a rotary shaft 111.

The step motor 110 includes a two-phase step motor and a higher-phase count step motor. Further, there are three basic types of step motors such as a variable reluctance (VR) type step motor, a permanent magnet (PM) type step motor, and a hybrid type step motor.

According to the present invention, the step motor 110 is configured to have multiple tooth-shaped electromagnets around a metal gear. In this case, these electromagnets are driven by the electric current received from an external control circuit (for example, the controller 120) such as a microcontroller. So as to rotate the rotary shaft 111 of the step motor 110, first, one electromagnet receives power to pull teeth of the gear theretowards. If the teeth of the gear are aligned linearly to the first electromagnet, the gear becomes slowly inclined toward the second electromagnet. If the second electromagnet receives the power, as a result, the first electromagnet is turned off, and the teeth of the gear are aligned linearly to the second electromagnet. Such operations are repeatedly carried out. In this case, each rotation is called 'step', and a number of steps make a full rotation. Accordingly, the step motor 110 can precisely rotate by a given angle.

The controller 120 controls operations and/or resources of various components (for example, the step motor 110, the light emitting body 151, and so on) located in the cube 100.

The controller 120 is a microcontroller or embedded device with a processor and memory. The controller 120 further includes a communication module for performing wireless communication with the central control terminal 200 and/or other cubes.

The processor of the controller 120 includes CPU, GPU, MCU, microprocessor, and so on. The memory of the controller 120 stores various data and computer programs such as the data received/inputted from the outside, the data produced from the controller 120, and so on. The memory includes volatile memory and non-volatile memory. For example, the memory includes a flash memory, ROM, RAM, EEROM, EPROM, EEPROM, solid state disc (SSD), register, and so on. Further, the memory includes a file system, database, and embedded database.

According to the present invention, on the other hand, a protrusion is formed inside the rotary shaft 111 of the step motor 110 so as to allow the controller 120 to recognize an original point of a rotation. Specifically, the controller 120 has a sensor adapted to recognize the protrusion, and a point at which the protrusion is sensed is recognized as the original point.

An explanation of the functions of the controller 120 within the technical scope of the present invention will be in more detail given later.

The battery 125 supplies power to the components (for example, the step motor 110, the controller 120, the light emitting body 151, and so on) of the cube 100. The battery 125 is charged with external power coming into contact with the charging terminals 181 and/or 182.

The light emitting body 151 emits light therefrom. For example, the light emitting body 151 is a light emitting diode. The light emitting body 151 emits various colors of light under the control of the controller 120. Further, the light emitting body 151 emits light consistently or emits flashing light.

According to the present invention, the light emitting body 151 emits light through a light emitting area formed in the housing 101 so that the light emitted can be recognized from the outside.

Figure 8:
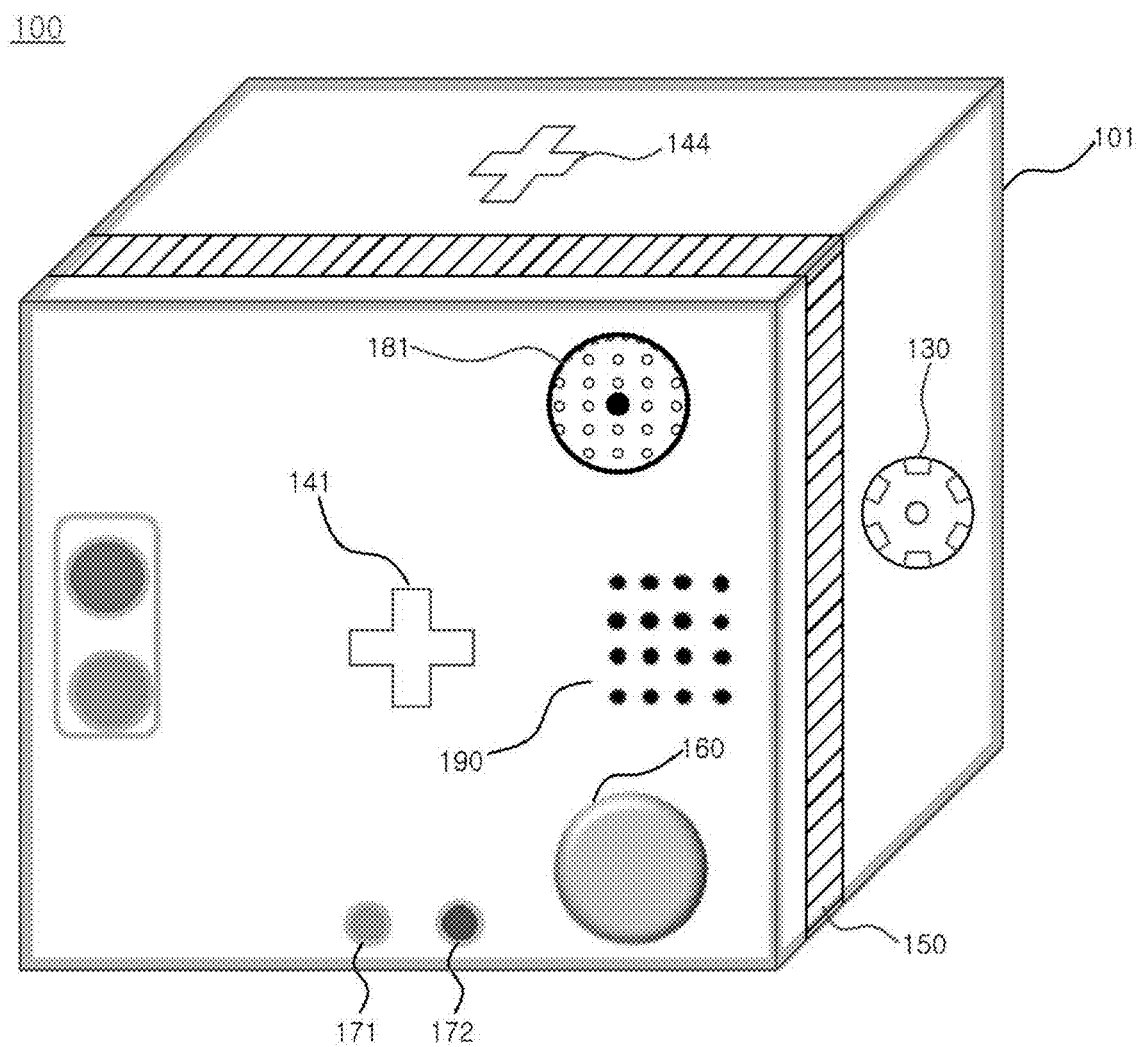
FIG. 8 is a perspective view showing an outer shape of the cube-type unit robot constituting the modular robot system according to the present invention.

FIG. 8 is a perspective view showing an outer shape of the cube-type unit robot constituting the modular robot system according to the present invention, and FIGS. 9A to 9F are views showing the surfaces of the cube-type unit robot constituting the modular robot system according to the present invention. FIGS. 9A to 9F show front, back, left side, right side, plan, and bottom surfaces of the cube 100 in the order mentioned.

Referring to FIG. 8, the cube-type unit robot (hereinafter referred to as 'cube') includes the cube-type housing 101. As mentioned above, further, the step motor 110 is located inside the housing 101 (See FIG. 7).

Figure 9A:
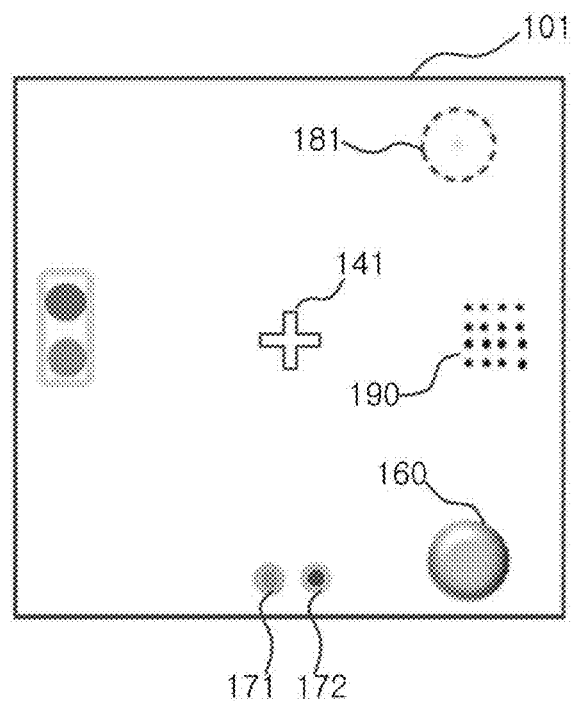
FIGS. 9A, 9B, 9C, 9D, 9E, and 9F are views showing the surfaces of the cube-type unit robot constituting the modular robot system according to the present invention.
Figure 9B:
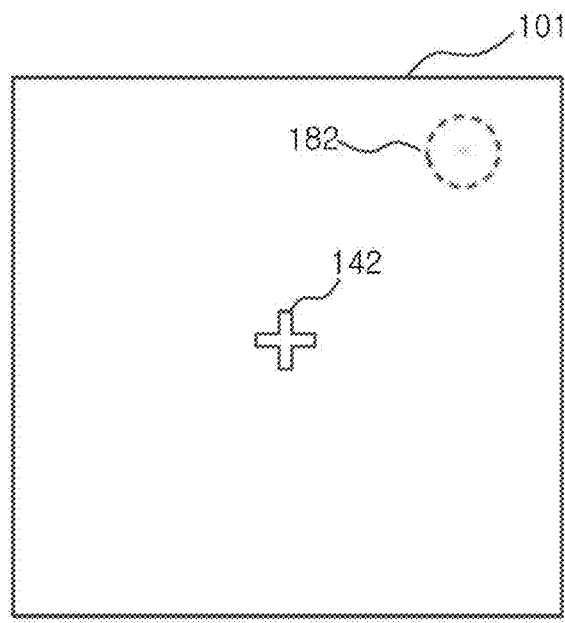
Figure 9C:
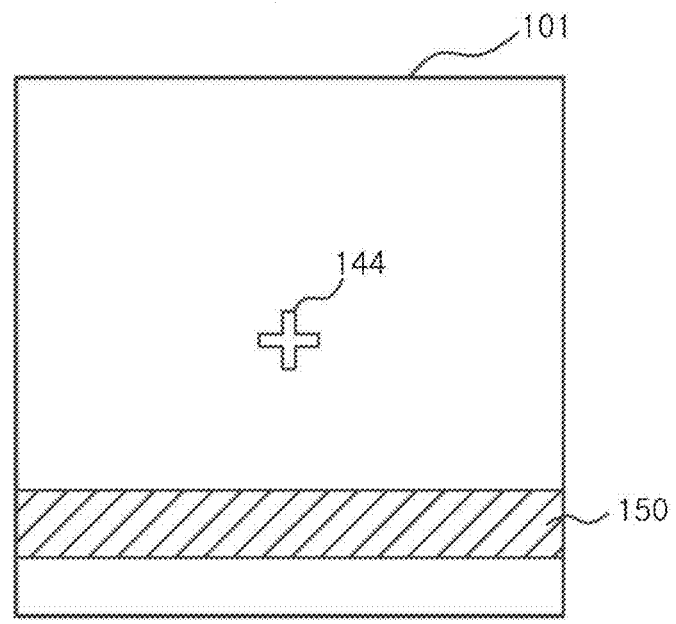
Figure 9D:
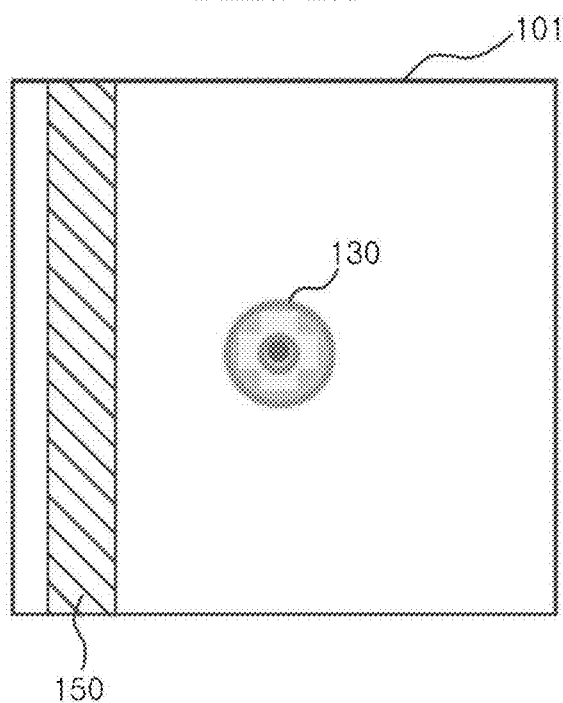
Figure 9E:
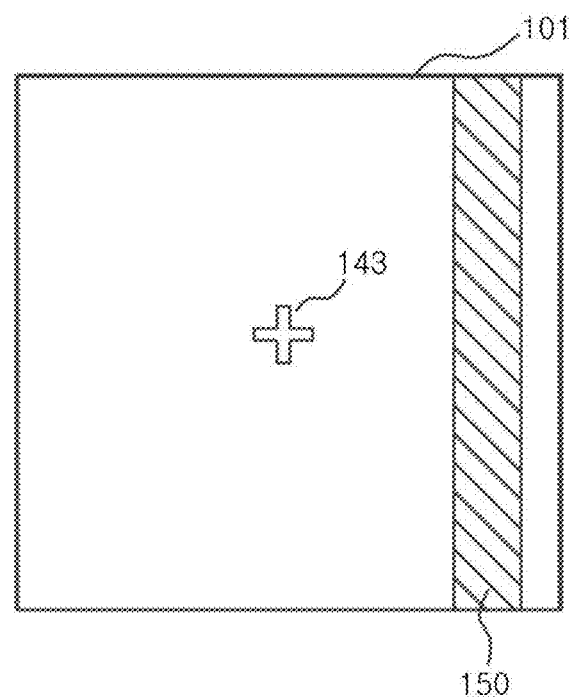

As shown in FIGS. 8 and 9D, the housing 101 has a mounting groove 130 formed on one surface thereof to mount the rotary body rotating by the rotary shaft 111 of the step motor 110 thereon. For example, the rotary body mounted on the mounting groove 130 is a wheel or propeller. The rotary body may have various sizes and shapes, but of course, it has a mounting portion fitted to the mounting groove 130.

As shown in FIGS. 8, 9A to 9C, 9E, and 9F, connection grooves 141 to 145 are formed on the five surfaces of the housing 101. The connection grooves 141 to 145 formed on the five surfaces of the housing 101 have the same shape as one another. For example, the connection grooves 141 to 145 have the same cross shape as one another, but of course, they are not limited thereto.

The connectors are mounted onto the connection grooves 141 to 145. The connectors are parts or accessories connectable to the cube 100.

The connectors may have various sizes and shapes, but of course, they have a mounting portion fitted to any one of the connection grooves 141 to 145. If the connection grooves 141 to 145 are concavely formed to have the shape of a cross, for example, the mounting portions of the connectors are convexly formed to have the same cross shape as the connection grooves 141. On the other hand, some of the connectors may have two or more mounting portions to allow two or more cubes 100 to be connected thereto.

Hereinafter, the rotary body and the connectors are indicated with a term 'accessories'.

According to the present invention, the housing 101 has a light emitting area 150, and the cube 100 further includes a button 160, state display LEDs 171 and 172, and/or a speaker 190.

Figure 9F:
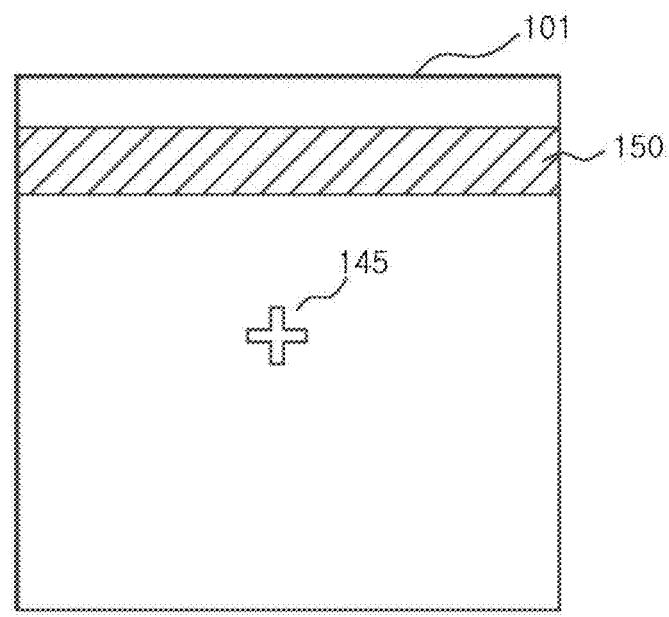

The light emitting area 150 is an area in which the light emitted from the light emitting body 151 is emitted. As shown in FIGS. 8 to 9F, the light emitting area 150 is provided to the shape of a band over the entire surface of the housing 101 except the front and back surfaces thereof, but there are no specific limitations in position, shape, and size. According to the present invention, the light emitting area 150 with various positions and shapes may be formed on the housing 101.

The button 160 is used when a user turns on and off the cube 100.

Further, the button 160 is used when a mode of the cube 100 is converted. For example, if the button 160 is pressed over a given time (for example, 3 seconds) in a state where power is turned off, the power is turned on to make the cube 100 in standby mode. If the button 160 is pressed in the standby mode, the state display LEDs 171 and 172 are turned off to convert the standby mode into sleep mode.

The state display LEDs 171 and 172 emit different colors of light therefrom. For example, the state display LED 171 emits blue light, and the state display LED 172 green light.

The state display LEDs 171 and 172 provide various kinds of visual effects indicating the states of the cube 100 under the control of the controller 120. For example, the state display LED 171 flashes before the wireless connection to the central control terminal 200 is finished and emits light continuously after the wireless connection has been finished. The state display LED 172 is turned on, while the battery is being charged, and it is turned off, while the battery is being not charged. If a charged state of the battery is under a given level, the state display LED 172 can flash.

The speaker 190 outputs various kinds of sounds under the control of the controller 120.

As shown in FIGS. 8, 9A, and 9B, the charging terminals 181 and 182 are located on the front and back surfaces of the housing 101. The charging terminal 181 is connected to external power, and in some cases, it comes into contact with the charging terminal of another cube. For example, if the charging terminal 181 of the first cube 100-1 is connected to the external power and the other charging terminal 182 thereof comes into contact with the charging terminal 181 of the second cube 100-2, the second cube 100-2 is charged with the power received through the first cube 100-1. In some cases, three or more cubes are laid sequentially on one another and are thus charged together.

Figure 10:
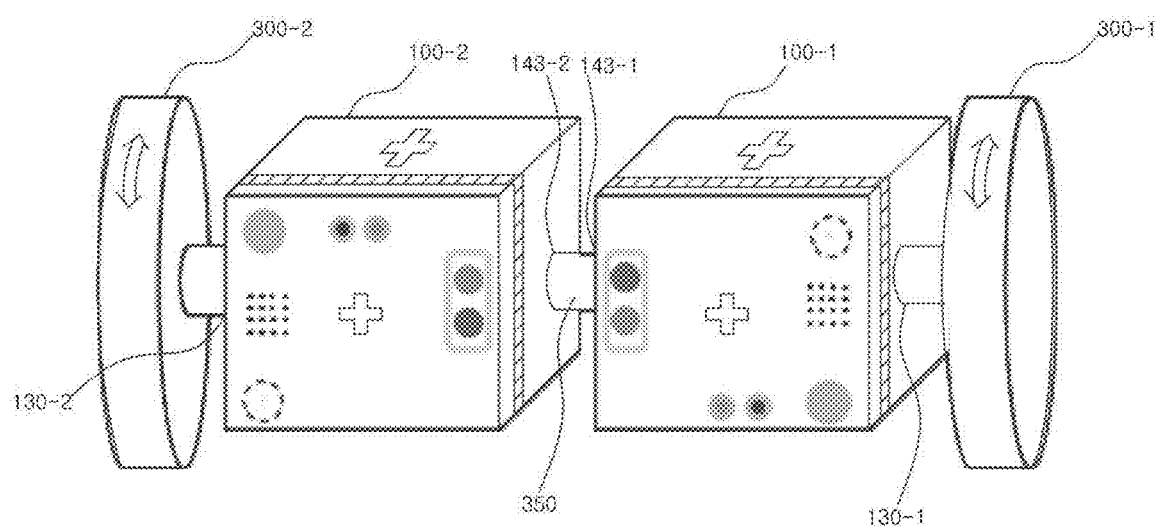
FIG. 10 is a perspective view showing a state where one cube-type unit robot constituting the modular robot system according to the present invention is connected to another cube-type unit robot and accessories.

On the other hand, the N cube-type unit robots 100-1 to 100-N are coupled to one another through the connectors as mentioned above. FIG. 10 is a perspective view showing a state where one cube-type unit robot constituting the modular robot system according to the present invention is connected to another cube-type unit robot and accessories.

Referring to FIG. 10, the wheel-shaped rotary body 300-1 is mounted on the mounting groove 130-1 formed on the right surface of the first cube 100-1. Another wheel-shaped rotary body 300-2 is mounted on the mounting groove 130-2 formed on the right surface of the second cube 100-2. The rotary bodies 300-1 and 300-2 rotate by means of the step motors of the cubes 100-1 and 100-2 coupled thereto.

Further, one connector 350 is mounted on the mounting groove 130-1 formed on the left surface of the first cube 100-1 and on the mounting groove 130-2 formed on the left surface of the second cube 100-2. Through the connector 350, like this, the two cubes 100-1 and 100-2 are coupled to each other.

As shown in FIG. 10, the two cubes 100-1 and 100-2 connected to each other, the rotary bodies 130-1 and 130-2 connected to the cubes, the connector 350 connecting the two cubes 100-1 and 100-2, and the central control terminal 200 controlling the two cubes 100-1 and 100-2 constitute one modular robot system finished.

FIG. 10 just shows the modular robot system with a very simple configuration for the brevity of the description, but of course, three or more cubes and the accessories with various shapes may constitute the modular robot system. As the unit cubes are coupled with one another through different coupling ways or the shapes of accessories are changed, the modular robot system may have drastically different shapes. According to the present invention, that is, the unit cubes with the simple configuration are coupled to one another through various coupling ways to provide the modular robot system with various shapes.

As mentioned above, the central control terminal 200 is wirelessly connected to the cubes 100 and controls the cubes 100. Hereinafter, an explanation of a process of wirelessly connecting the central control terminal 200 to the cubes 100 will be given with reference to FIG. 11.

On the other hand, the central control terminal 200 can control the modular robot made with the cubes belonging to the group to allow the modular robot to perform any one of various activities.

Data that defines the respective activities can be provided as the forms of lookup tables corresponding to the activities. In this case, each lookup table includes descriptors of step motor control sequences corresponding to the respective cubes constituting the modular robot performing the activities.

The step motor control sequences are lists of the step motor control operations performed by each cube 100 (more accurately, the controller 120 of the cube 100). For example, the step motor control sequences are lists of the number of pulses per unit time. The descriptors of step motor control sequences are storable data for defining the step motor control sequences.

On the other hand, identification numbers are in advance applied to the respective cubes, and the step motor control sequences can correspond to the identification numbers applied to the respective cubes.

FIG. 11 is a view showing an example of a lookup table including descriptors of step motor control sequences defining one activity. In FIG. 11, a lookup table 1000 defines a specific activity performed by the modular robot with four cubes.

As shown in FIG. 11, the lookup table 1000 includes the descriptors of four step motor control sequences 1000-1 to 1000-4 performing one activity.

The first cube 100-1 with the identification number 1 performs the first step motor control sequence 1000-1, the second cube 100-2 with the identification number 2 the second step motor control sequence 1000-2, the third cube 100-3 with the identification number 3 the third step motor control sequence 1000-3, and the fourth cube 100-4 with the identification number 4 the fourth step motor control sequence 1000-4.

In the example of FIG. 11, the first cube 100-1 rotates the step motor by 30 pulses every unit time. Contrarily, the third cube 100-3 reversely rotates the step motor by 30 pulses every unit time. The second cube 100-2 repeats rotation by 60 pulses, reverse rotation by 30 pulses, and rotation by 90 pulses. The fourth cube 100-4 repeats rotation by 60 pulses, rotation by 90 pulses, and rotation by 120 pulses.

The step motor control sequences of FIG. 11 are just examples, and of course, they may have various values finely adjusted according to activities. Further, the forms of the step motor control sequences may be freely provided only if the rotating operations of the step motors of the cubes are defined individually. For example, the step motor control sequences may become lists with values of driving time and pulses. In this case, one value may indicate a rotation pulse of the step motor for a specific driving time.

According to the present invention, various motions can be provided through the adjustment of only the step motor control sequences performed by the cubes.

According to the present invention, further, the step motor control sequences include lists of rotating angles of the step motors with respect to the original points of the step motors. For example, the step motor control sequences have the forms of [30, 60, 30, −30], which means that the step motor rotates for initial unit time to move to a position of 30° from the original point, rotates for next unit time to move to a position of 60° from the original point, reversely rotates for another next unit time to move to a position of 30° from the original point, and reversely rotates for another next unit time to move to a position of −30° from the original point.

According to the present invention, on the other hand, the lookup table including the descriptors of the step motor control sequences is stored in the central control terminal 200. In this case, the central control terminal 200 in advance transmits the step motor control sequences performed by the cubes to the cubes, individually, before the activity is performed.

According to the present invention, further, the lookup table may be in advance stored in each cube (accurately, the controller 120 of the cube). In this case, each cube extracts the step motor control sequence to be performed from the lookup table and thus performs the step motor control sequence.

According to the present invention, the respective cubes store all lookup tables corresponding to all of the activities performed thereby, and if the group/model/activity are selected, the cubes extract the step motor control sequences to be performed from the lookup table corresponding to the selected group/model/activity and thus perform the step motor control sequences.

So as to allow one modular robot system with N cubes to perform a given activity in a proper way, on the other hand, it is necessary for the N cubes to perform the step motor control sequences on exact time. Accordingly, there is a need for a process where the N cubes are synchronized with one another and a process where the synchronized N cubes control their step motors. Hereinafter, an explanation on these processes will be in detail given with reference to FIG. 12.

Figure 12:
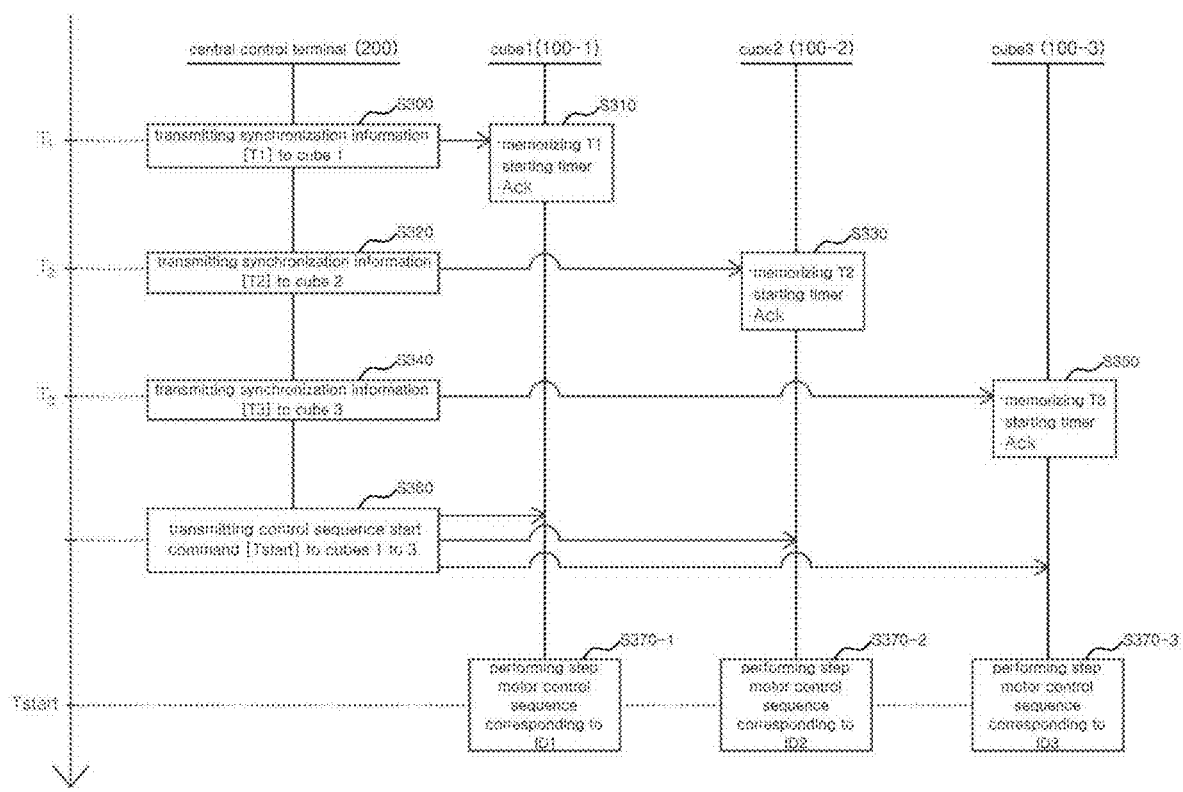
FIG. 12 is a flowchart showing synchronization processes among the cube-type unit robots and a central control terminal.

FIG. 12 is a flowchart showing synchronization and activity executing processes among the cube-type unit robots and the central control terminal. In FIG. 12, steps are indicated on the time line with respect to the timer operating in the central control terminal 200. FIG. 12 shows the modular robot with three cubes.

Referring to FIG. 12, the central control terminal 200 transmits synchronization information to the cubes, and in this case, the synchronization information of each cube includes a synchronization information transmission time point measured with respect to the timer operating in the central control terminal 200.

In specific, the central control terminal 200 transmits synchronization information to the first cube 100-1 at a time point of T1 (Step S300). The synchronization information includes information on the time point of T1.

The first cube 100-1 which receives the synchronization information stores the time point of T1 of the synchronization information, and after starting its own timer, it transmits an acknowledgement signal Ack to the central control terminal 200 (Step S310).

Further, the central control terminal 200 transmits synchronization information to the second cube 100-2 at a time point of T2 (Step S320). The synchronization information includes the information on the time point of T2.

The second cube 100-2 which receives the synchronization information stores the time point of T2 of the synchronization information, and after starting its own timer, it transmits an acknowledgement signal Ack to the central control terminal 200 (Step S330).

Furthermore, the central control terminal 200 transmits synchronization information to the third cube 100-3 at a time point of T3 (Step S340). The synchronization information includes the information on the time point of T3.

The third cube 100-3 which receives the synchronization information stores the time point of T3 of the synchronization information, and after starting its own timer, it transmits an acknowledgement signal Ack to the central control terminal 200 (Step S350).

After receiving the last acknowledgement signal Ack, the central control terminal 200 transmits a control sequence start command to the first to third cubes 100-1 to 100-3 (Step S360). In this case, the control sequence start command includes start time point Tstart information calculated with respect to the timer operating in the central control terminal 200.

The central control terminal 200 determines as the start time point Tstart the time point after a given time from the time point at which the last acknowledgement signal Ack is received, and in this case, the determination is made in full consideration of the time during which signal/data are transmitted to the cubes through wireless communication. The central control terminal 200 can determine the start time point Tstart with sufficient spare time to allow the start time point Tstart to come after the control sequence start command has been transmitted to the cubes.

On the other hand, the cubes are synchronized with one another with respect to the timer of the central control terminal 200, so that they can recognize whether the start time point Tstart contained in the control sequence start command comes or not through their own timer and the transmission time points of the synchronization information received thereto. Accordingly, the cubes at the start time point Tstart start to perform the step motor control sequences corresponding to their identification numbers in advance applied thereto (Steps S370-1, S370-2, and S370-3).

On the other hand, the user directly builds the step motor control sequences to be performed by the respective cubes to develop a new activity or corrects the existing step motor control sequences to customizedly operate the modular robot in his or her desired way. To do this, the central control terminal 200 can provide a UI through which the user can build/correct the step motor control sequences.

The disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. For example, the parts expressed in a singular form may be dispersedly provided, and in the same manner as above, the parts dispersed may be combined with each other.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. The present invention is applicable to a method for forming a group of a plurality of Bluetooth devices.

The invention claimed is:

1. A method for forming a group of a plurality of Bluetooth devices, comprising:
    forming one subgroup with some of the plurality of Bluetooth devices; and
    with respect to Bluetooth mediating devices that are at least some of the plurality of Bluetooth devices belonging to the subgroup, forming, by each Bluetooth mediating device, one lower subgroup having the subgroup as an upper subgroup thereof, together with the plurality of Bluetooth devices which do not yet belong to any subgroup, wherein forming one subgroup with some of the plurality of Bluetooth devices comprises:

setting any one of the plurality of Bluetooth devices belonging to the subgroup as a Bluetooth central device of the subgroup; and connecting other Bluetooth devices, as Bluetooth peripheral devices of the subgroup, except the Bluetooth central device of the plurality of Bluetooth devices belonging to the subgroup, to the Bluetooth central device of the subgroup, and wherein forming, by each Bluetooth mediating device, one lower subgroup having the subgroup as the upper subgroup thereof, together with the plurality of Bluetooth devices which do not yet belong to any subgroup, comprises:

setting the Bluetooth mediating devices as multi-role Bluetooth devices, the multi-role Bluetooth devices operating as the Bluetooth peripheral devices with respect to the Bluetooth central device belonging to upper subgroups thereof and as the Bluetooth central devices with respect to the Bluetooth devices belonging to lower subgroups thereof; and connecting the other Bluetooth devices, as the Bluetooth peripheral devices of the lower subgroups, except the Bluetooth mediating devices of the plurality of Bluetooth devices belonging to the lower subgroups, to the Bluetooth mediating devices as the Bluetooth central devices of the lower subgroups, wherein each Bluetooth device is a cube-type unit robot, the cube-type unit robot comprising:

a cube shaped housing;

a step motor located inside the housing; and a controller located inside the housing to control the step motor, wherein the housing has a mounting groove formed on one surface thereof to mount a rotary body rotating by a rotary shaft of the step motor thereon and connection grooves with the same shape as each other formed on the other surfaces thereof, so that through connectors mounted on the connection grooves, the cube-shaped unit robot is connectable to another cube-type unit robot.

2. The method according to claim 1, wherein setting any one of the plurality of Bluetooth devices belonging to the subgroup as the Bluetooth central device of the subgroup comprises:

connecting an uppermost Bluetooth device that is any one of the plurality of Bluetooth devices belonging to the subgroup, as the Bluetooth peripheral device, to a given control device; and setting the uppermost Bluetooth device as the multi-role Bluetooth device.

3. The method according to claim 1, further comprising, with respect to end Bluetooth mediating devices that are at least some of the plurality of Bluetooth devices belonging to at least one end subgroup having no lower subgroup, forming, by each end Bluetooth mediating device, one lower subgroup having the subgroup to which the end Bluetooth mediating device belongs as an upper subgroup thereof, together with the plurality of Bluetooth devices which do not yet belong to any subgroup.

4. The method according to claim 1, further comprising:

if the uppermost Bluetooth central device as the Bluetooth central device of the uppermost subgroup receives a given control command, after the group of the plurality of Bluetooth devices has been formed, transmitting the given control command to the Bluetooth peripheral devices belonging to the uppermost subgroup; and if each Bluetooth mediating device of the group of the plurality of Bluetooth devices receives the given control command from the Bluetooth central device of the subgroup thereof, transmitting the given control command to the Bluetooth peripheral devices connected thereto.

5. A non-transitory computer-readable recording medium recording a computer program for performing a method for forming a group of a plurality of Bluetooth devices, comprising:

forming one subgroup with some of the plurality of Bluetooth devices; and with respect to Bluetooth mediating devices that are at least some of the plurality of Bluetooth devices belonging to the subgroup, forming, by each Bluetooth mediating device, one lower subgroup having the subgroup as an upper subgroup thereof, together with the plurality of Bluetooth devices which do not yet belong to any subgroup, wherein forming one subgroup with some of the plurality of Bluetooth devices comprises:

setting any one of the plurality of Bluetooth devices belonging to the subgroup as a Bluetooth central device of the subgroup; and connecting other Bluetooth devices, as Bluetooth peripheral devices of the subgroup, except the Bluetooth central device of the plurality of Bluetooth devices belonging to the subgroup, to the Bluetooth central device of the subgroup, and wherein forming, by each Bluetooth mediating device, one lower subgroup having the subgroup as the upper subgroup thereof, together with the plurality of Bluetooth devices which do not yet belong to any subgroup, comprises:

setting the Bluetooth mediating devices as multi-role Bluetooth devices, the multi-role Bluetooth devices operating as the Bluetooth peripheral devices with respect to the Bluetooth central device belonging to upper subgroups thereof and as the Bluetooth central devices with respect to the Bluetooth devices belonging to lower subgroups thereof; and connecting the other Bluetooth devices, as the Bluetooth peripheral devices of the lower subgroups, except the Bluetooth mediating devices of the plurality of Bluetooth devices belonging to the lower subgroups, to the Bluetooth mediating devices as the Bluetooth central devices of the lower subgroups, wherein each Bluetooth device is a cube-type unit robot, the cube-type unit robot comprising:

a cube shaped housing;

a step motor located inside the housing; and a controller located inside the housing to control the step motor, wherein the housing has a mounting groove formed on one surface thereof to mount a rotary body rotating by a rotary shaft of the step motor thereon and connection grooves with the same shape as each other formed on the other surfaces thereof, so that through connectors mounted on the connection grooves, the cube-shaped unit robot is connectable to another cube-type unit robot.

* * * * *